United States Patent
Low et al.

(10) Patent No.: US 9,751,597 B1
(45) Date of Patent: Sep. 5, 2017

(54) UNMANNED FLUID-PROPELLED AERIAL VEHICLE

(71) Applicant: Lockheed Martin Corporation, Bethesda, MD (US)

(72) Inventors: Nathan E. Low, Baldwinsville, NY (US); Peter J. Demas, Manlius, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 14/700,958

(22) Filed: Apr. 30, 2015

Related U.S. Application Data

(60) Provisional application No. 62/024,594, filed on Jul. 15, 2014.

(51) Int. Cl.
| | |
|---|---|
| *B63B 35/00* | (2006.01) |
| *B63B 25/00* | (2006.01) |
| *B64C 39/02* | (2006.01) |

(52) U.S. Cl.
CPC ............ *B63B 25/002* (2013.01); *B63B 35/00* (2013.01); *B64C 39/022* (2013.01); *B64C 39/024* (2013.01); *B64C 2201/121* (2013.01)

(58) Field of Classification Search
CPC ..... B63B 35/00; B63B 25/002; B64C 39/022; B64C 39/024; B64C 39/026; B64C 5/02; B64C 5/12; B64C 2201/16; B64C 2201/10
See application file for complete search history.

(56) References Cited

U.S. PATENT DOCUMENTS

| | | | | |
|---|---|---|---|---|
| 3,078,658 | A | * 2/1963 | Sargent | ................... F02C 7/057 60/243 |
| 3,234,902 | A | * 2/1966 | Booth | .................... B63H 23/26 440/5 |
| 3,245,637 | A | 4/1966 | Eickmann | |
| 3,421,253 | A | 1/1969 | Thurston | |
| 3,474,987 | A | * 10/1969 | Meditz | .................. B64C 39/026 244/17.11 |
| 3,503,574 | A | 3/1970 | Eickmann | |
| 4,024,827 | A | * 5/1977 | Becker | ................. B63H 25/381 114/162 |
| 4,040,577 | A | 8/1977 | Moore | |
| 4,348,976 | A | 9/1982 | Gilbert | |
| 4,714,380 | A | * 12/1987 | Coutarel | ................. F16L 27/00 242/615.2 |
| 4,738,212 | A | 4/1988 | Schweitzer | |
| 4,868,408 | A | * 9/1989 | Hesh | ......................... F03B 3/04 290/52 |
| 5,314,130 | A | * 5/1994 | Wood | .................... B65H 51/10 242/388.6 |

(Continued)

*Primary Examiner* — Assres H Woldemaryam
(74) *Attorney, Agent, or Firm* — Howard IP Law Group, PC

(57) ABSTRACT

A water-propelled or water-powered unmanned aerial vehicle including a base configured to carry a payload, and at least one nozzle attached thereto. The at least one nozzle is configured to selectively receive pressurized fluid from a source located remotely from the vehicle. The vehicle includes a control system configured to alter or otherwise selectively dictate the flow of fluid through the at least one nozzle and/or the orientation of the at least one nozzle with respect to the base in response to a received control signal for providing controlled unmanned vehicle flight.

18 Claims, 6 Drawing Sheets

(56) References Cited

U.S. PATENT DOCUMENTS

| | | | |
|---|---|---|---|
| 5,679,035 A | 10/1997 | Jordan | |
| 6,336,833 B1* | 1/2002 | Rheault | B63H 21/21 |
| | | | 114/144 R |
| 7,258,301 B2* | 8/2007 | Li | A63B 35/00 |
| | | | 114/315 |
| 7,614,355 B2* | 11/2009 | Zeyger | B64C 39/026 |
| | | | 114/55.58 |
| 7,735,772 B2 | 6/2010 | Li | |
| 7,900,867 B2 | 3/2011 | Li | |
| 8,336,805 B1* | 12/2012 | Zapata | B64C 39/026 |
| | | | 114/315 |
| 8,449,340 B1* | 5/2013 | Zeyger | B63H 11/04 |
| | | | 114/55.56 |
| 8,818,572 B1* | 8/2014 | Tofte | B64C 39/024 |
| | | | 244/75.1 |
| 2002/0092458 A1* | 7/2002 | Ku | B63B 3/08 |
| | | | 114/312 |
| 2005/0178886 A1* | 8/2005 | Potter | B64G 1/26 |
| | | | 244/52 |
| 2006/0192047 A1* | 8/2006 | Goossen | B64C 27/20 |
| | | | 244/17.23 |
| 2008/0087762 A1* | 4/2008 | Holloman | B64C 1/0009 |
| | | | 244/30 |
| 2011/0180667 A1* | 7/2011 | O'Brien | B64C 39/022 |
| | | | 244/135 R |
| 2012/0138733 A1* | 6/2012 | Hiebl | B64B 1/58 |
| | | | 244/30 |
| 2013/0233964 A1 | 9/2013 | Woodworth et al. | |
| 2014/0374542 A1* | 12/2014 | Li | B64C 39/026 |
| | | | 244/4 A |

* cited by examiner ically, the application relates to water-propelled
unmanned vehicles for lifting payloads in a maritime envi-
UNMANNED FLUID-PROPELLED AERIAL VEHICLE

CROSS-REFERENCE TO RELATED APPLICATIONS

This application claims priority to, and benefit under 35 U.S.C. §119(e) of, U.S. Provisional Application No. 62/024,594 entitled "Unmanned Water-Propelled Aerial Vehicle", filed on Jul. 15, 2014, the entire disclosure of which is hereby incorporated by reference for all purposes as if being set forth in its entirety herein.

FIELD OF THE INVENTION

This application relates to water-propelled vehicles. More particularly, the application relates to water-propelled unmanned vehicles for lifting payloads in a maritime environment.

BACKGROUND

Unmanned aerial vehicles (UAVs) are useful for a wide variety of both civilian and military applications. In the maritime environment, for example, there is a need for UAVs to perform various payload lifting operations, including payload lifting in electronic warfare scenarios. Current solutions designed to lift payloads in these environments include electric and internal combustion engine powered UAVs. These vehicles tend to be large in size and expensive to produce and operate. Moreover, their lifting mechanisms and associated propulsion systems are inherently heavy and reduce lifting capacity.

Alternative systems offering large payload space, weight and/or power (SWAP) margins, while providing long endurance and the ability to operate in a maritime environment are desired.

SUMMARY

In one embodiment of the present disclosure, there is provided a water-propelled or water-powered unmanned aerial vehicle. The vehicle includes a base configured to carry a payload, and at least one nozzle attached thereto. The at least one nozzle is configured to selectively receive pressurized fluid from a source located remotely from the vehicle and expel said fluid in a controlled manner. The vehicle includes a control system configured to alter or otherwise selectively dictate the flow of fluid through the at least one nozzle and/or the orientation of the at least one nozzle with respect to the base in response to a received control signal, thereby providing controlled or remotely controlled unmanned vehicle flight.

The vehicle may include an actuator responsive to a control signal for altering the orientation of the at least one nozzle with respect to the base. In one aspect, the actuator may be embodied as a linear actuator having a first end attached to the base and a second end, movable with respect to the first end, and attached to the at least one nozzle. In one embodiment, one or more valves may be configured to alter the flow of fluid through the at least one nozzle in response to a control signal generated by the control system. In one embodiment, the control system may be configured to receive control signals from a remote source for selectively controlling the flight of the vehicle. The control system may comprise a memory device that stores program instructions including a predetermined vehicle flight plan which, when executed via a computer processor, controls operational characteristics associated with the unmanned vehicle to provide autonomous vehicle flight. The vehicle may further include at least a navigational sensor such as a global positioning sensor (GPS), an accelerometer, a gyroscope and/or an altimeter, in communication with the control system, to provide controlled flight of the vehicle.

In one embodiment, the control system may include an aerial vehicle controller associated with the aerial vehicle; and a surface vehicle controller associated with the surface vehicle and in communication with the aerial vehicle controller.

The surface vehicle controller may be hard wired or in wireless communication with the aerial vehicle controller.

In one embodiment, the surface vehicle controller is responsive to control signals received from the aerial vehicle for controlling the position of the surface vehicle and the fluid flow rate from the surface vehicle.

The surface vehicle may further include a winch for storing the fluid conduit. The winch is responsive to control signals received from at least one of the aerial vehicle controller and/or the surface vehicle controller for selectively altering the length of the conduit during flight of the aerial vehicle.

In one embodiment, the surface vehicle further comprises at least one of a pump monitoring sensor, an accelerometer, a GPS and a conduit reel position sensor.

In one embodiment, the surface vehicle further comprises an on-board power source. In one embodiment, the surface vehicle further includes an inlet control valve for controlling the volume of fluid drawn in by the fluid pump from a fluid source.

In one embodiment, the surface vehicle further comprises a memory device, the memory device storing instructions including a predetermined vehicle flight plan for providing autonomous flight of the aerial vehicle.

In another embodiment of the present disclosure, an unmanned hydraulic payload lifting system is provided. The system includes a fluid-propelled aerial vehicle having a nozzle configured to receive and expel pressurized fluid for providing vertical thrust. The system further includes a marine surface vehicle having a fluid pump. A conduit is provided and operatively attached to the marine surface vehicle and the aerial vehicle for providing pressurized fluid from the fluid pump to the nozzle. The system further comprises a control system configured to alter at least one of the flow of fluid through and out of the nozzle, and the orientation of the nozzle with respect to the aerial vehicle, for providing controlled aerial vehicle flight. The system may further comprise a communications system configured to provide communication between at least one of the aerial vehicle, and/or marine surface vehicle and a remote command station. The surface vehicle further comprises a steering system and a propulsion system for providing heading and velocity control of the surface vehicle.

DETAILED DESCRIPTION

Figure 1:
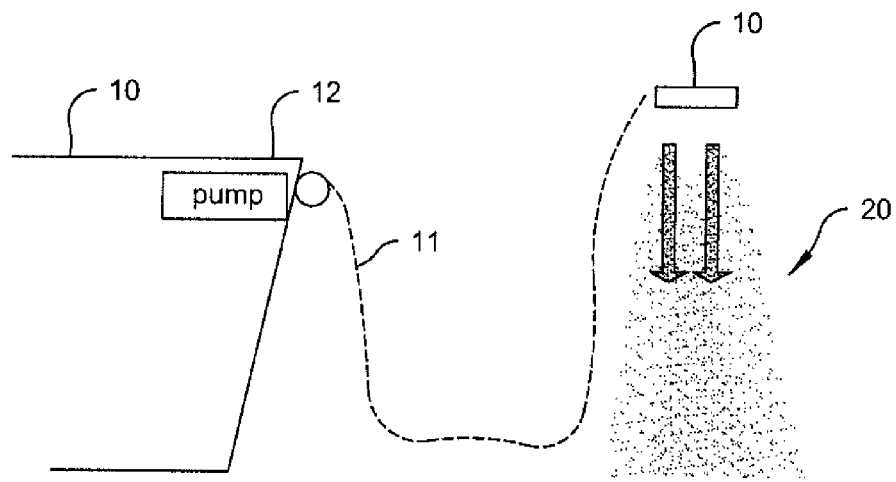
FIG. 1 is a simplified perspective view of a fluid-propelled UAV and fluid delivery system according to an embodiment of the present disclosure.

It is to be understood that the figures and descriptions of the present invention have been simplified to illustrate elements that are relevant for a clear understanding of the present invention, while eliminating, for purposes of clarity, many other elements found in typical aerial vehicles, including unmanned aerial vehicles under remote or autonomous control. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Fluid-powered UAVs according to embodiments of the present disclosure achieve significant improvements in their thrust-to-weight ratios, and thus their payload capacity, over the systems of the prior art. This is achieved by relocating the propulsion source (e.g. one or more engines) of the UAV to a remotely-located platform, such as a marine surface vehicle (SV). In one embodiment, a pressurized fluid source (e.g. a fluid pump) may be located on a separate floating platform or SV. The source may be configured to provide the UAV with pressurized fluid (e.g. water) via a fluid conduit, such as a flexible hose connected therebetween. Three-axis UAV flight control with up to six degrees of freedom may be achieved by selectively actuating and/or orienting one or more nozzles (also referred to herein as "thrusters" or "water jets") arranged on the UAV and in communication with the pressurized fluid. The UAV may comprise mission-configurable payload bays, hotel services (e.g. electrical, cooling, communications, and telemetry systems) as well as guidance and flight control systems for achieving unmanned/autonomous launch, recovery, controlled flight and mission capabilities. UAVs and respective SVs according to these embodiments are designed to operate together in a coordinated fashion (transit together or maintain position together), including in heavy sea states and other adverse weather conditions.

Referring generally to FIG. 1, a fluid-powered UAV 10 according to an embodiment of the present disclosure is shown. As illustrated, pressurized fluid (e.g. sea water) is provided to UAV 10 from a fluid pump 12 located remotely on a ship or vessel 14, via a fluid conduit 11. The fluid is supplied to one or more water jets or nozzles (not shown) located on UAV 10, that receive the water at an input and expel at an output, a pressurized water stream 20. This generates thrust for UAV 10 for powered flight. Fluid pump 12 may be retrofitted to an existing vessel 14 to support UAV missions, or conduit 11 may be attached to an existing onboard fluid pump of vessel 14 for supplying UAV 10 with pressurized fluid. In one embodiment, vessel 14 may serve as a host platform for UAV 10, with UAV 10 launched and optionally recovered therefrom. As will be set forth in greater detail herein, UAV 10 may be responsive to control signals received from vessel 14 (e.g. signals generate by a remote vehicle pilot residing in vessel 14) for performing flight operations. In alternative embodiments, UAV 10 may be pre-programmed with a flight plan for automated flight without real-time user or pilot intervention (i.e. without human intervention).

Figure 2:
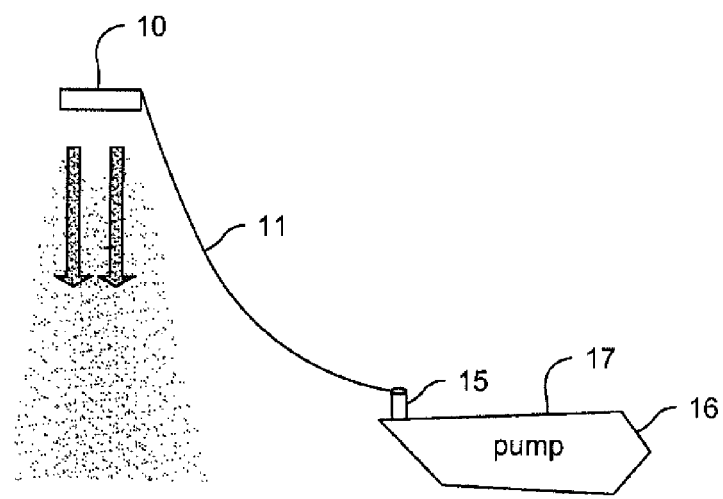
FIG. 2 is a simplified perspective view of a fluid-propelled UAV and fluid delivery system according to another embodiment of the present disclosure.

Referring generally to FIG. 2, an alternative embodiment of the present disclosure is shown, including an SV 16 used for providing pressurized fluid to UAV 10. SV 16 may be self-powered via on-board drive and navigation systems such that it may be navigated at sea either under the control of an onboard pilot or operator, or under remote or autonomous control. A fluid pump 15 (e.g. a centrifugal or axial fluid pump) is arranged on or within SV 16 and configured to intake fluid (e.g. seawater), pressurize the fluid, and output or otherwise supply the pressurized fluid to UAV 10 via conduit 11. The use of SV 16 may provide increased mobility as SV 16 and UAV 10 may be piloted or otherwise navigated to areas remote from, for example, a larger host vessel used to deploy these assets (e.g. host vessel 14 of FIG. 1).

SV 16 may also include a hose management system, e.g., a reel or spool arrangement (not shown) for storing conduit 11 when UAV 10 is not in flight. In one embodiment, UAV 10 and SV 16 may also be configured to enable the UAV to be launched and deployed from the SV. In one embodiment, this may be achieved by providing, for example, an exterior surface of SV 16 sized and located such that UAV 10 may be landed thereon and launched therefrom. In one embodiment, the surface may be embodied as a generally planar platform or deck 17 located on SV 16. A protective enclosure or compartment may also be provided on SV 16 for storage of UAV 10.

The following equations bound the flow rate (A) and water pressure $P_{hose}$ (B) necessary to achieve a lift force F with cross-sectional area of the nozzle $Area_{nozzle}$ and hose $Area_{hose}$. The required force F must consider lifted weight such as the payload, aerial vehicle body, and hose weight. The water pressure $P_{hose}$ must be offset with losses incurred through the water manifold components and hose $P_{loss}$ as well as the pressure required to lift the water to an elevation $P_{elevation}$ and the atmospheric pressure at elevation $P_{atmospheric}$.

$$FlowRate = \sqrt{\frac{Area_{nozzle} \cdot F}{\rho_{water}}} \qquad \text{Eq. A}$$

$$P_{hose} = P_{elevation} + P_{loss} + P_{atmospheric} + \qquad \text{Eq. B}$$
$$\frac{1}{2} \cdot \rho_{water} \cdot FlowRate^2 \left( \frac{1}{Area_{nozzle}^2} - \frac{1}{Area_{hose}^2} \right)$$

Figure 3:
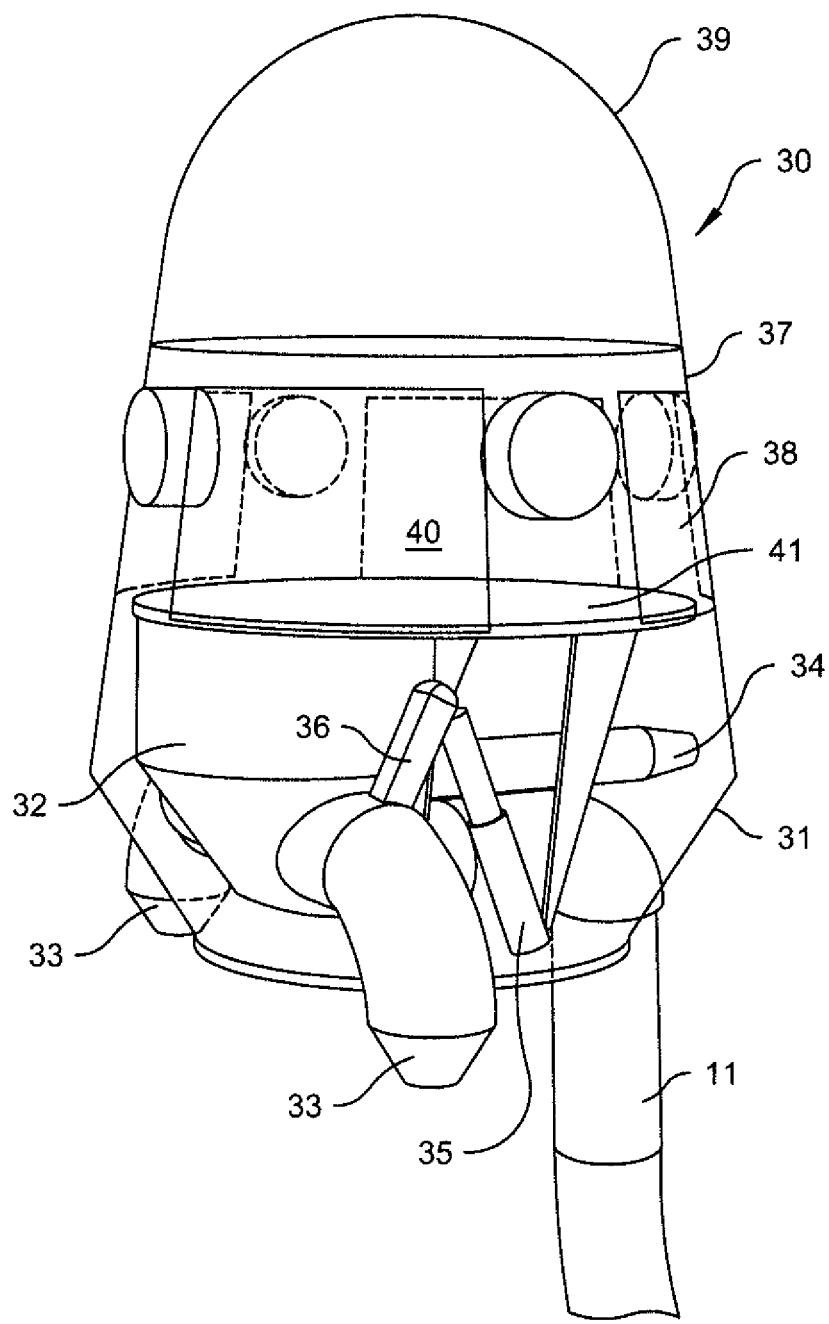
FIG. 3 is a simplified perspective view of a fluid-propelled UAV according to an embodiment of the present disclosure.

FIG. 3 illustrates a more detailed view of an exemplary UAV according to an embodiment of the present disclosure. UAV 30 includes a base 31 defining one or more interior compartments for housing propulsion and control components. In the illustrated embodiment, a propulsion subassembly includes a manifold 32 in fluid communication with a pressurized fluid source via a conduit 11 removably attached thereto. Conduit 11 delivers pressurized fluid from, for example, an SV and associated fluid pump located remotely from UAV 30 (e.g. SV 16 of FIG. 2). Conduit 11 may be movably attached to manifold 32 via, for example, a rotatable connection (e.g. a swiveling connection) so as to provide for unrestricted rotation of UAV 30 relative to conduit 11. Additionally, conduit 11 may be movably attached to manifold 32 via, for example, a three-axis connection (e.g. a ball joint connection) so as to provide even more unrestricted rotation of UAV 30 relative to conduit 11.

In the exemplary embodiment, thrusters or water jets (e.g. nozzles) 33 are arranged in selective fluid communication with manifold 32 for providing vertical and/or horizontal thrust to UAV 30 for achieving three-dimensional flight. More specifically, water jets 33 may be rotatably mounted on or within base 31, such that directional control over UAV 30 may be provided by influencing the net force vector acting on UAV 30. A rotatable arm or linkage 36 may be connected to each water jet 33 and configured to rotate water jet 33 under a force applied thereon by an actuator 35 (e.g. a linear actuator). More specifically, actuator 35 may be mounted with a first end fixed with respect to base 31, and a moveable second end in contact with or connected to an end of rotating arm 36. Extension and/or retraction of actuator 35 acts on rotatable arm 36, rotating water jet 33 to a desired/targeted angular orientation. While linear actuators are shown and described, it should be understood that other types of actuators, including rotary actuators, may be implemented without departing from the scope of the present disclosure.

While rotation of water jets 33 about a single axis is shown, multi-axis connections and associated actuators may be implemented and configured to provide multi-axis rotation and thus provide enhanced control over water jets 33. In one embodiment, this may include a separate actuator for each axis of rotation of a water jet 33. Other embodiments may comprise a single actuator capable of providing multi-axis rotation (e.g. a spherical motor). In the exemplary embodiment, a third horizontal water jet 34 may be provided and arranged in selective fluid communication with manifold 32. Water jet 34 is arranged generally horizontally with respect to base 31 for providing independent and/or additional horizontal thrust control of UAV 30. Water jet 34 may be fixed or moveably mounted with respect to base 31 for providing additional control by altering a direction of the fluid expelled therefrom.

While not illustrated for the purposes of simplicity, it should be understood that one or more remotely controllable valves may be arranged generally between manifold 32 and water jets 33,34. These devices are configured to selectively control characteristics such as the volume of pressurized fluid supplied thereto in order to achieve a desired force vector. In other embodiments, water jets 33,34 may comprise variable geometry nozzles, wherein desired thrust characteristics may be achieved by altering the nozzles' critical dimensions (e.g. outlet opening size, internal taper, etc.) via, for example, mechanical actuators.

UAV 30 further comprises an optional body 37 defining an internal payload bay 40 used to store a desired payload therein. In the exemplary embodiment, payload bay 40 comprises a generally open, planar deck 41. A payload may be secured or mounted thereto. Access to payload bay 40 may be provided via one or more doors or openings 38 of body 37. A cover 39 may also be fitted over payload bay 40, thereby providing added protection. Body 37 may be constructed of strong lightweight non-metallic composites, and may also include materials suitable for use as radomes for RF transmission surfaces. Body 37 may be shaped so as to achieve a desired low radar cross-section (RCS).

Figure 4:
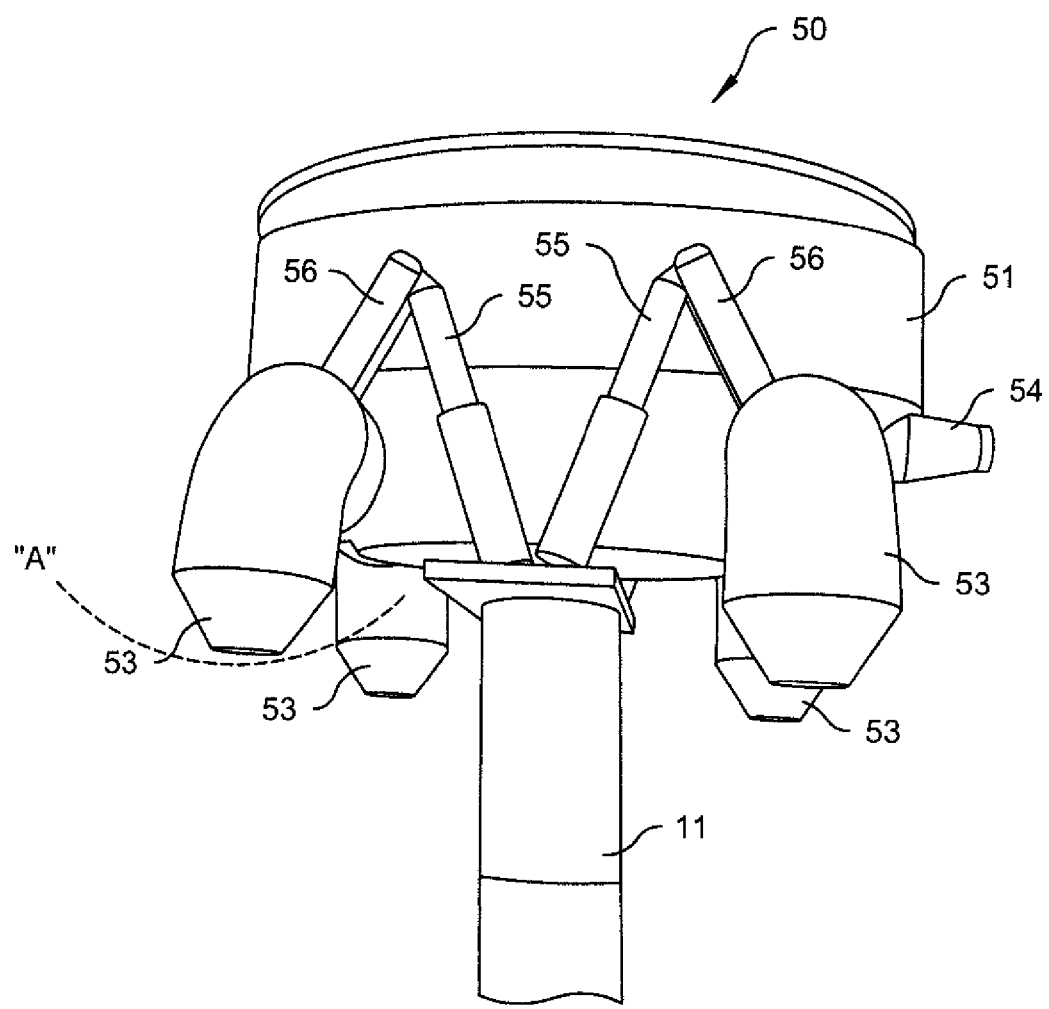
FIG. 4 is a simplified perspective view of a fluid-propelled UAV according to another embodiment of the present disclosure.

Referring generally to FIG. 4, another exemplary embodiment of a UAV 50 is shown. The UAV includes a base 51 having a manifold arranged therein (see FIG. 3) in fluid communication with a centrally-mounted fluid conduit 11. Base 51 may also house control and communications systems, as set forth in greater detail with respect to FIG. 7. In the illustrated embodiment, UAV 50 includes four (4) water jets 53 each rotatable about at least a single axis with respect to base 51 for providing both vertical and horizontal flight control. A supplemental horizontal water jet 54 may optionally be provided. As described with respect to FIG. 3, water jets 53 may be selectively rotated via corresponding actuators 55 and rotating arms or linkages 56 for providing controllable flight of UAV 50. More specifically, water jets 53 may be rotated such that the orientation of the nozzles thereof may be varied along respective arcs (e.g. illustrated arc "A").

Figure 5:
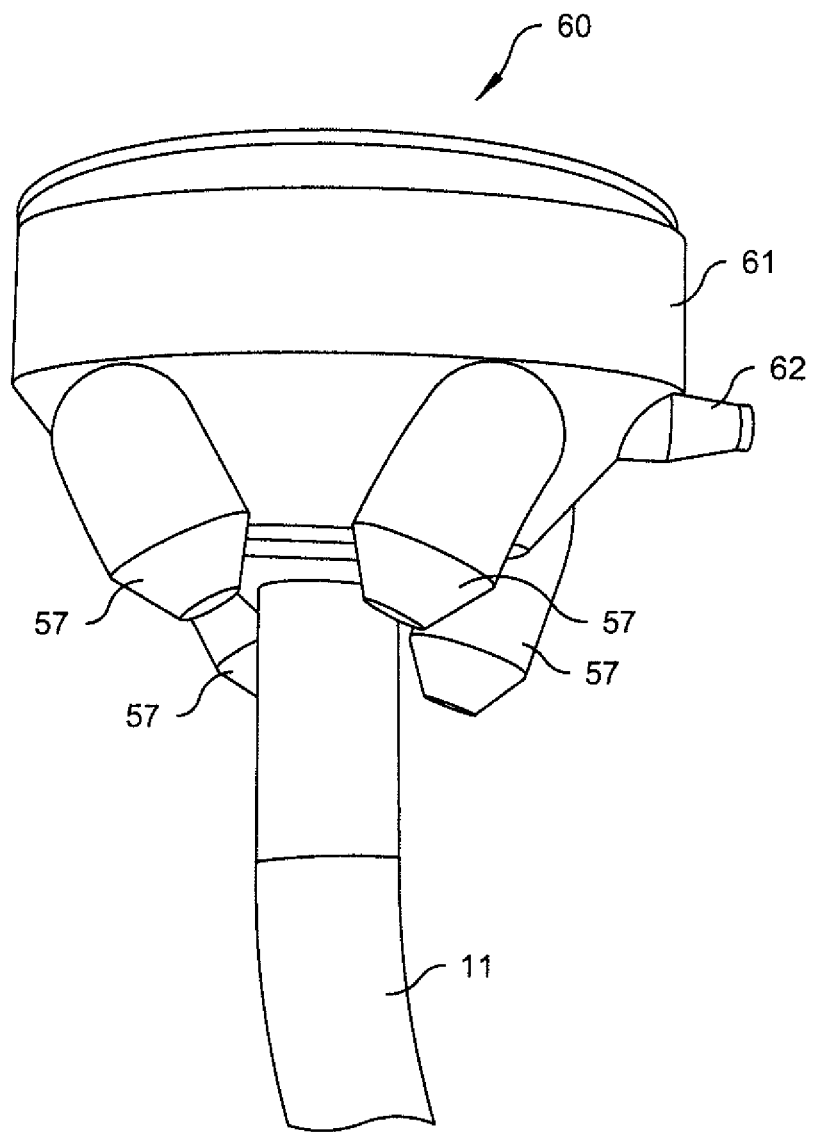
FIG. 5 is a simplified perspective view of a fluid-propelled UAV according to another embodiment of the present disclosure.

Referring generally to FIG. 5, in another embodiment, a UAV 60 comprises water jets 57 fixed in position with respect to a base 61 (e.g. fixed at a predetermined angular position), providing a simplified and lighter-weight propulsion system. Pairs of water jets 57 may be fixed in an at least partially opposing orientation and configured to generate force vectors that cancel or limit rotational movement of UAV 60. In this embodiment, the use of a horizontal water jet 62 may be particularly beneficial for providing improved rotational and horizontal thrust control. By controllably modulating the flow among pairs of water jets 57, the UAV's rotation, lateral movement and height or elevation above the surface may be effectively controlled.

Figure 6:
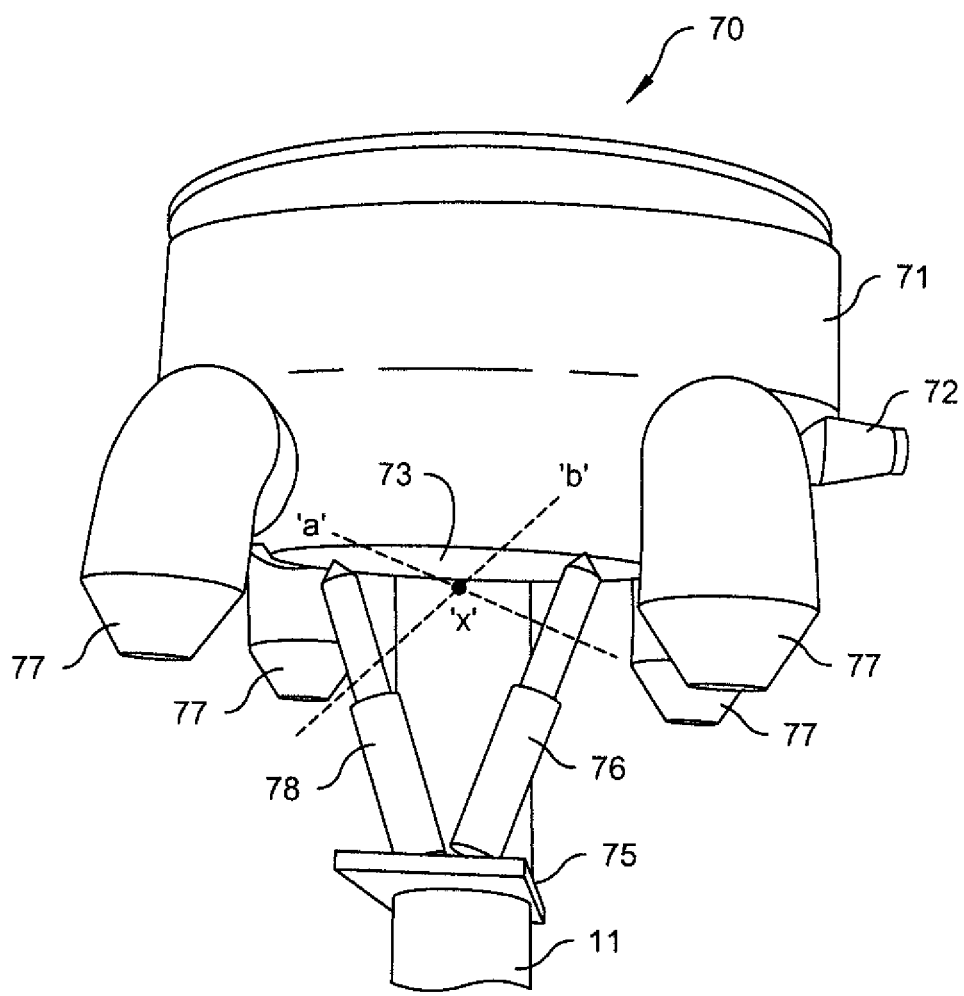
FIG. 6 is a simplified perspective view of a fluid-propelled UAV according to another embodiment of the present disclosure.

FIG. 6 illustrates another embodiment of a UAV 70 according to the present disclosure. UAV 70 includes water jets 77 that may be fixed in orientation relative to a base 71. One or more horizontal water jets 72 may also be provided, as set forth above with respect to the proceeding figures, in order to provide improved rotational and/or horizontal thrust control. In the exemplary embodiment, directional control may be achieved via actuators 76,78 (e.g. linear actuators) arranged between a conduit 11 and base 71. In this way, actuators 76,78 are used to pivot UAV 70 with respect to the fluid conduit. In one embodiment, actuators 76,78 may be arranged at generally 90 degrees with respect to one another, so as to provide for independent rotation of base 71 about respective illustrated perpendicular axes a,b intersecting generally at common pivot point x. In one embodiment, conduit 11 may be connected to a lower surface 73 of base 71 via a rotatable or pivotable connection so as to provide for the above-described rotation about at least two perpendicular axes a,b. In other embodiments, conduit 11 may be fixedly attached to base 71. Rotation of base 71 relative to conduit 11 may be achieved via the flexible nature of conduit 11. In the illustrated embodiment, conduit 11 may be fitted with a support structure 75 for connecting to a first end of each actuator 76,78, with the second ends of actuators 76,78 connected to lower surface 73 of base 71.

Figure 7:
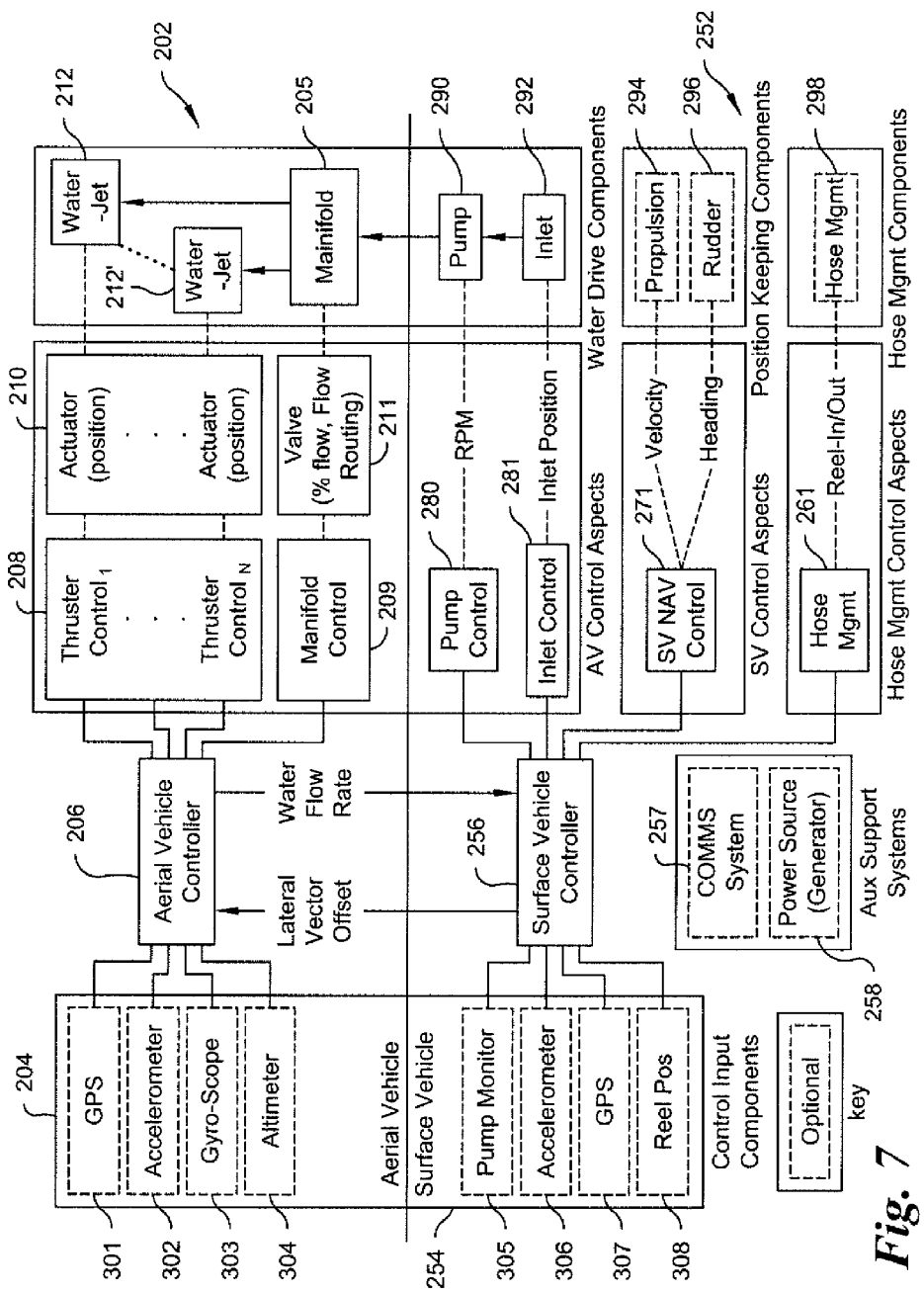
FIG. 7 is a system diagram illustrating exemplary components of a fluid-propelled aerial vehicle and surface vehicle according to an embodiment of the present disclosure.

Referring generally to FIG. 7, a system diagram for a UAV 202 and SV 252 according to an exemplary embodiment of the present disclosure is provided. UAV 202 may include an on-board sensor package 204, including GPS system(s) 301, one or more accelerometers 302, one or more gyroscopes 303 and an altimeter 304 for measuring current position and motion. While a limited number of sensors are illustrated, it should be understood that sensor package 204 may comprise any number and type of sensors for achieving sustained unmanned flight of UAV 202.

A flight controller, embodied herein as aerial vehicle controller (AVC) 206 is also provided. AVC 206 is responsive to data received from sensor package 204, as well as from communications with SV 252 or other outside control sources, for providing pre-programmed and/or remote flight control of UAV 202. AVC 206 may be embodied as one or more processors, including one or more memory devices, and is configured to provide control signals to thrust controllers$_{1-N}$ 208 (e.g. one or more application-specific or general processors) for controlling the angular position of nozzles or water jets 212,212' via actuators$_{1-N}$ 210 (e.g. the above-described linear actuators of an exemplary UAV). AVC 206 is further configured to provide control signals to a manifold controller 209 (e.g. one or more application-specific or general processors). Manifold controller 209 may be operatively connected to one or more valves 211 (or to actuators for controlling said valves) for selectively controlling the distribution of pressurized fluid to each of water jets 212,212' from manifold 205. In this way, AVC 206 is operative to provide flight control of UAV 202 including, for example, heading, height, roll and pitch control. AVC 206 may also be configured to control additional actuators for altering the nozzle dimensions of water jets 212,212', as set forth above. AVC 206 may be further configured to control any payload functions (e.g. payloads carried by UAV 202) necessary for a given mission.

In one embodiment, a predetermined flight plan may be stored in memory within or accessible by AVC 206, and executed upon command. For example, a non-transitory computer-readable storage medium may store thereon instructions that when executed by a processor result in performance according to any of the embodiments described herein. In embodiments, each of the steps of the methods may be performed by a single computer processor or CPU, or performance of the steps may be distributed among two or more computer processors or CPU's of two or more computer systems.

Still referring to FIG. 7, SV 252 may comprise a remotely or autonomously controlled floating marine vehicle (e.g. SV 16 of FIG. 2) configured for self-powered operation. SV 252 includes a sensor package 254, including, by way of non-limiting example only, a pump monitoring sensor 305, an accelerometer 306, a GPS system 307, as well as a reel position sensor 308 for controlling the feed and retraction of the conduit, thereby providing pressurized fluid for UAV 202. While a limited number of sensors are illustrated, it should be understood that sensor package 254 may comprise any number and type of sensor for achieving remote operation, as well as for monitoring and controlling the propulsion and fluid delivery systems of the SV.

A surface vehicle controller (SVC) 256 may be embodied as one or more processors, including one or more memory devices, and is responsive to data received from sensor package 254, from received external communications (e.g. from UAV 202 or a control or command station), and/or from a source of a predetermined, stored flight path, for controlling fluid delivery to UAV 202 to achieve desired/targeted flight characteristics. For example, SVC 256 may be configured to provide one or more control signals to a pump controller 280 (e.g. one or more application-specific or general processors) for controlling the output (e.g. via RPM control) of a fluid pump 290. Fluid pump 290 provides the head and flow rate required for water jets 212,212' to provide a reaction force sufficient to lift UAV 202 and any associated payload. The output of pump 290 is connected to manifold 205 of UAV 202 via, for example, the above-described flexible conduit or hose.

SVC 256 also provides control signals to an inlet controller 281 (e.g. one or more application-specific or general processors) for controlling, for example, the amount of fluid (e.g. water) drawn in by pump 290, which may include altering the position and/or dimensions of a pump inlet 292. Positional control of pump inlet 292 may be provided via one or more actuators, and may be especially important for maintaining uninterrupted fluid communication between the fluid source (e.g. the sea) and inlet 292 during, for example, high sea states. In addition to modulating pump power, SVC 256 may be configured to provide an offset or supplemental control vector to AVC 206 for providing supplemental control of the nozzles for desired/targeted three-dimensional movement/control.

SV 252 may further comprise a communications system 257, for example, an RF transceiver for communicating with UAV 202 (e.g. with a corresponding RF transceiver of UAV 202) and/or with a remotely-located command and control station. In this way, UAV 202 and SV 252 may be responsive to control signals for operation under real-time remote control. In one embodiment, SVC 256 may be responsive to control signals provided by AVC 206 for controlling both the position of the SV 252 (e.g. alter the position of SV 252 according to the position of UAV 202 as identified by GPS system 301), as well as fluid flow rate requirements to be provided by SV 252 to UAV 202. Positional control of inlet 292 may also be provided via a control signal from AVC 206 to SVC 256. Communications system 257 (or a similar communications system on UAV 202) may also be configured to receive predetermined flight data (e.g. flight path and/or operation information), which may be stored in AVC 206 and/or SVC 256 and used to dictate the flight of UAV 202, as well as control the positioning of both UAV 202 and SV 252.

SV 252 may further comprise on-board power sources, for example, a generator 258 and/or battery for powering the systems of SV 252. Power may also be provided to UAV 202 via a conduit, for powering its above-described systems. In other embodiments, UAV 202 may be provided with its own power supply, such as a battery, which may be recharged via a conduit by SV 252. In an additional embodiment, UAV 202 may generate power locally for its payload using a local generator contained within UAV 202 driven by the hydraulic fluid flow provided by SV 252.

SVC 256 may also be configured to control the position and navigation of SV 252. For example, SV navigation controller 271 (e.g. one or more application-specific or general processors) may be configured to be responsive to control signals received from SVC 256 to control the velocity and heading of SV 252. This may be achieved by, for example, controlling a propulsion device 294 (e.g. a marine engine) of SV 252, as well as steering components, such as one or more rudders 296. In this way, SV navigation controller 271 may operate to provide autonomous or remote-controlled operation of SV 252 according to specific mission parameters. In other embodiments, propulsion for SV 252 may be provided by a pump, which may be the same pump used to provide pressurized fluid to UAV 202 (e.g. pump 290).

SV 252 may further comprise a reel or winch arrangement 298 on which the fluid and/or electrical/optical conduits may be stored. In this embodiment, SVC 256 is configured to output control signals to a reel management controller 261 (e.g. one or more application-specific or general processors), for selectively controlling reel arrangement 298 for deployment and recover of the conduit(s).

Water jets according to embodiments of the present disclosure may be located below as well as above the center of gravity of the UAV. These water jets may be independently and autonomously pre-programmed, or remotely controlled (e.g. via radio transmission) by an onboard aerial vehicle inertial navigation system to provide three axis stabilization as autonomously or remotely commanded, in a dynamic environment where the vehicle is exposed to various dynamic forces (e.g. wind) to achieve and maintain the aerial vehicle in flight or at a commanded position, altitude and attitude.

It should be understood that conduit 11 between the UAV and SV according to any of the embodiments of the present disclosure may comprise an internal passage for supplying fluid to the UAV. Moreover, electrical power, communications signals, control signals, and other data and/or telemetry signals, for both the UAV and the payload, may be transmitted by electrical or optical connections integrated into the conduit, or may be provided in separate conduits attached to conduit 11. In other embodiments, each of the UAV and SV may comprise one or more transceivers for wirelessly transmitting all or a portion of this information.

As set forth above, embodiments of the SVs of the present disclosure may comprise an on-board propulsion system, a guidance system to control water speed and direction of transport and loiter, and a water pump for providing an integrated transport, launch, and recovery platform for an UAV. SVs according to embodiments of the present disclosure may optionally provide payload bays including hotel services for any payloads stored therein. In operation, the SV may be used to protect the UAV and its payload(s) from the surrounding elements and transport the UAV with its payload(s) through the water under remote or pre-programmed autonomous control to a launch site. After arriving at predetermined destination, the UAV would then be launched from the SV via liquid propulsion from the pressurized fluid provided by the SV to the UAV.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A water-propelled unmanned aerial vehicle comprising:
   a base configured to carry a payload enclosed therein;
   at least one nozzle attached to the base, the nozzle configured to selectively receive and expel pressurized water from a source located remotely from the vehicle;
   a control system configured to alter at least one of the flow of water through the at least one nozzle; and the orientation of the at least one nozzle with respect to the base, in response to a received control signal, to provide controlled flight of the vehicle;
   an actuator responsive to a control signal generated by the control system for altering the orientation of the at least one nozzle with respect to the base; and
   an electrical generator configured to be driven by the water and operatively connected to the control system for supplying electrical power thereto.

2. The aerial vehicle of claim 1, wherein the actuator comprises a linear actuator having a first end attached to the base and a second end, movable with respect to the first end, and attached to the at least one nozzle.

3. The aerial vehicle of claim 1, further comprising at least one of a global positioning sensor (GPS), an accelerometer, a gyroscope and an altimeter, in communication with the control system, to provide controlled flight of the vehicle.

4. A water-propelled unmanned aerial vehicle comprising:
   a base defining a payload bay configured to carry a payload enclosed therein;
   a plurality of nozzles attached to the base, the nozzles configured to selectively receive and expel pressurized water from a source located remotely from the vehicle;
   a control system configured to alter at least one of the flow of water through the at least one nozzle; and the orientation of at least one of the plurality of nozzles with respect to the base, in response to a received control signal, to provide controlled flight of the vehicle;
   an actuator responsive to a control signal generated by the control system for altering the orientation of at least one of the plurality of nozzles with respect to the base; and an electrical generator operatively connected to the control system for supplying electrical power thereto.

5. An unmanned payload lifting system comprising:
a water-propelled aerial vehicle including a nozzle configured to receive and expel pressurized water to provide vertical thrust to said vehicle;
a marine surface vehicle including a pump;
a fluid conduit operatively attached to the marine surface vehicle and the aerial vehicle and configured to convey pressurized water from the pump to the nozzle;
a control system arranged on the aerial vehicle and configured to alter at least one of the flow of water through the nozzle; and the orientation of the nozzle, with respect to the aerial vehicle to control aerial movement of said aerial vehicle;
an actuator responsive to a control signal generated by the control system for altering the orientation of the nozzle with respect to the aerial vehicle;
an electrical conduit operatively connected between the marine surface vehicle and the aerial vehicle; and
an electrical generator arranged on the marine surface vehicle and operatively connected to the control system via the electrical conduit for supplying electrical power thereto.

6. The system of claim 5, wherein the control system includes:
an aerial vehicle controller associated with the aerial vehicle; and
a surface vehicle controller associated with the surface vehicle and in communication with the aerial vehicle controller.

7. The system of claim 6, wherein the surface vehicle controller is in wireless communication with the aerial vehicle controller.

8. The system of claim 7, wherein the surface vehicle controller is responsive to control signals received from the aerial vehicle for controlling the position of the surface vehicle and the water flow rate from the surface vehicle.

9. The system of claim 6, wherein the surface vehicle further comprises a winch for storing the fluid conduit, wherein the winch is responsive to control signals received from at least one of the aerial vehicle controller and the surface vehicle controller for selectively altering the length of the conduit during flight of the aerial vehicle.

10. The system of claim 5, wherein the surface vehicle further comprises at least one of a pump monitoring sensor, an accelerometer, a GPS and a conduit reel position sensor.

11. The system of claim 5, wherein the surface vehicle further comprises an inlet control valve for controlling the volume of water drawn in by the fluid pump from a water source.

12. The system of claim 5, wherein the surface vehicle further comprises a memory device, the memory device storing instructions including a predetermined vehicle flight plan for providing autonomous flight of the aerial vehicle.

13. The system of claim 5, wherein the surface vehicle further comprises a communications system configured to provide communication between at least one of the aerial vehicle and a remote command station.

14. The system of claim 5, wherein the surface vehicle further comprises a steering system and a propulsion system for providing heading and velocity control of the surface vehicle.

15. The aerial vehicle of claim 4, wherein the control system comprises a memory device, the memory device storing instructions including a predetermined vehicle flight plan for providing autonomous vehicle flight.

16. The aerial vehicle of claim 4, wherein the plurality of nozzles comprise:
a first plurality of nozzles arranged radially about, and rotatably attached to, the base; and
a horizontal thrust nozzle fixedly attached to the base and oriented so as to expel pressurized water in a direction generally horizontally with respect to the base.

17. The aerial vehicle of claim 4, further comprising a plurality of arms, each arm being fixedly attached to a respective nozzle of the first plurality of nozzles,
wherein the actuator comprises a plurality of linear actuators, each linear actuator comprising a first end fixedly attached to the base, and a second end moveable with respect to the first end in response to a control signal received from the control system, and
wherein the second moveable end of each of the plurality of linear actuators is in contact engagement with a respective one of the plurality of arms.

18. The aerial vehicle of claim 4, further comprising:
a manifold controller operatively connected to the control system; and
a plurality of valves associated with the plurality of nozzles, the plurality of valves in communication with the pressurized water and configured to alter the flow of water through each of the nozzles in response to a control signal received from the manifold controller.

* * * * *

UNITED STATES PATENT AND TRADEMARK OFFICE
CERTIFICATE OF CORRECTION

PATENT NO. : 9,751,597 B1
APPLICATION NO. : 14/700958
DATED : September 5, 2017
INVENTOR(S) : Nathan E. Low and Peter J. Demas It is certified that error appears in the above-identified patent and that said Letters Patent is hereby corrected as shown below:

In Column 12, Line 3, should read "volume of water drawn in by the pump from a water"

Signed and Sealed this
Twenty-sixth Day of December, 2017

Joseph Matal
*Performing the Functions and Duties of the
Under Secretary of Commerce for Intellectual Property and
Director of the United States Patent and Trademark Office*